Patented July 2, 1946

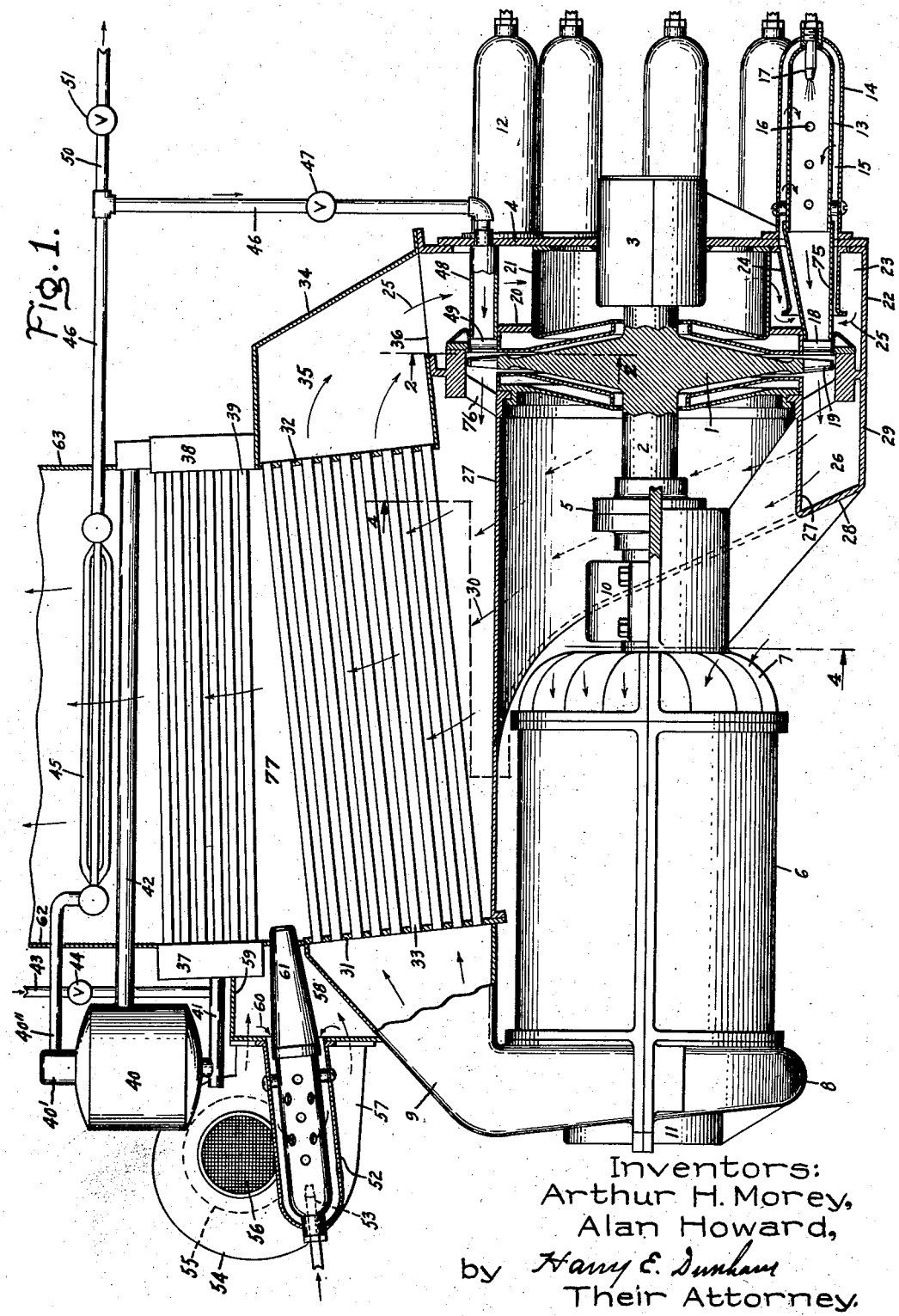

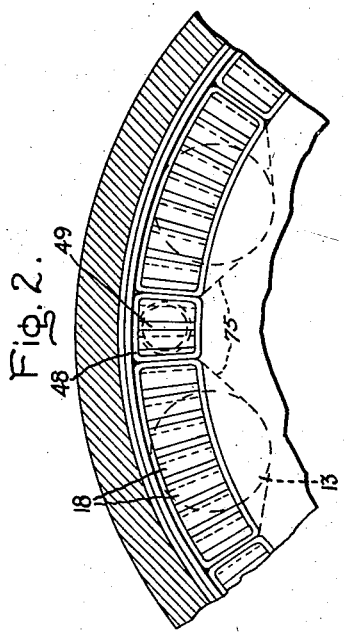
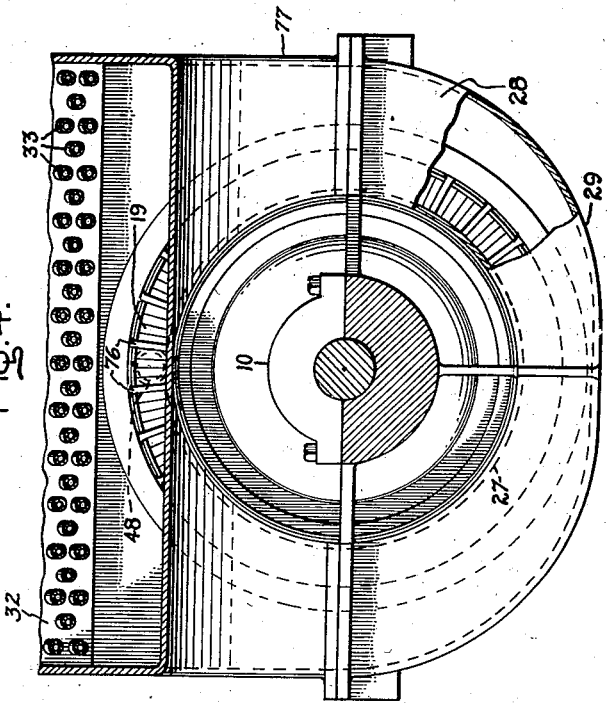
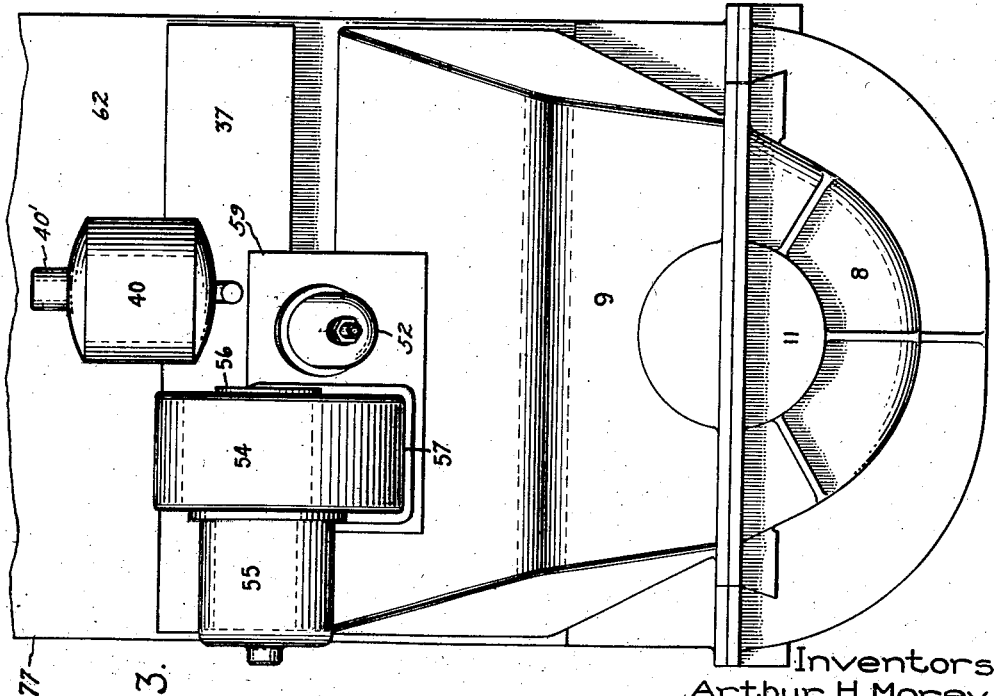

2,403,388

UNITED STATES PATENT OFFICE 2,403,388

GAS TURBINE POWER PLANT

Arthur H. Morey and Alan Howard, Schenectady, N. Y., assignors to General Electric Company, a corporation of New York Application April 26, 1944, Serial No. 532,785

3 Claims. (Cl. 60—49)

The present invention relates to gas turbine power plants. It finds especial utility in power plants for locomotives or other vehicles such as water craft, although the invention is not limited thereto necessarily.

The object of the invention is to provide an improved construction and arrangement in a power plant and for a consideration of what we believe to be novel and our invention, attention is directed to the following specification and to the claims appended thereto.

In the drawings:

Fig. 1 is an elevation partly in section of our complete powerplant; Fig. 2 is a view of the section 2—2 in Fig. 1 showing the relation of the steam and gas nozzle sections of the nozzle diaphragm; Fig. 3 is an end view in elevation of the complete powerplant shown in Fig. 1; and Fig. 4 is a view of the section 4—4 in Fig. 1 illustrating the arrangement of the turbine discharge casing and its relation to the turbine wheel and shaft and the preheater casing.

Referring to Fig. 1 of the drawings, 1 indicates a gas turbine wheel carried by a shaft 2 mounted at its outer end in a bearing 3 supported in an end frame wall 4. The inner end of shaft 2 is connected by a coupling 5 to the shaft of an air compressor 6. Air compressor 6 may be of any suitable type, either an axial flow compressor or a multistage radial flow centrifugal compressor. It receives air at the inlet end 7 and discharges air to a discharge chamber 8 from which the air flows to a discharge conduit 9. The compressor shaft is supported in suitable bearings 10 and 11. Mounted on end wall 4 is a series of combustion chambers or "combustors" 12. The combustion chambers may be of any suitable construction. One is shown in section at the lower right hand corner of the drawings. As shown, it comprises inner and outer spaced walls 13 and 14 defining between them a compressed air admission space 15 from which air is supplied to the interior of wall 13 through openings 16. At 17 is indicated a fuel supply nozzle. The gases generated by the fuel and air burned in the combustion chamber are supplied through transition section 75 and nozzles 18 to the buckets 19 of the turbine wheel. Fuel may be supplied to the fuel nozzles and the supply regulated by any suitable means.

In spaced relation to end wall 4 are suitably shaped walls 20, 21 and 22 which define an annular plenum chamber 23 from which air is supplied to the space 15 of the several combustion chambers, it being directed to such space by annular walls 24 which surround the transition sections 75 of the combustion chambers in spaced relation thereto. The path of the air flow is clearly indicated by arrows 25. Gases from the buckets 19 of the turbine wheel are discharged past the casing support struts 76 to a chamber 26 defined by an inner annular wall 27, an end wall 28 and an outer wall 29. Outer wall 29 extends across the bottom of the power plant and upward on each side of the power plant, it being substantially U-shaped in cross section as may be seen in Fig. 4. With this arrangement, chamber 26 is open at its upper end for the discharge of exhaust gases upwardly as hereinafter explained. The path of flow of exhaust gases is indicated by the arrows 30. The space between annular wall 27 and bearing 10 forms a housing for the bearing and coupling and also forms a wall for directing air to the inlet of the compressor.

Mounted on wall 27 and end wall 4 is an air preheater in the form of a heat exchanger comprising end plates 31 and 32 connected by tubes 33. At its left hand end the heat exchanger is connected with air discharge conduit 9. At its right hand end there are provided walls 34 which define a header 35 connected by an opening 36 with the annular plenum chamber 23. Thus air discharged from compressor 6 flows through tubes 33 to header 35 and from header 35 through opening 36 to annular plenum chamber 23 from which chamber it is supplied to the several combustion chambers. The gases discharged to chamber 26 from the turbine wheel flow across the heat exchanger tubes, thus serving to preheat the air supplied to the combustion chambers.

Suitably mounted on the walls of the heat exchanger is a steam waste heat boiler which may be of any suitable type. In the present instance it is shown as comprising headers 37 and 38 connected by boiler tubes 39. The boiler tubes 39 stand in the path of flow of the exhaust gases from the turbine wheel so that after such exhaust gases have passed across the tubes 33 of the heat exchanger, they flow across the tubes 39 of the steam boiler. At 40 is a water drum connected to headers 37 and 38 by equalizing pipes 41 and 42. At 43 is indicated a pipe provided with a valve 44 and through which water may be supplied to the boiler. At the top of water drum 40 is a steam dome 40' connected by a conduit 40" to a steam superheater 45 arranged in the path of flow of the exhaust gases above the boiler tubes 39. Connected with the discharge side of the superheater 45 is a pipe line 46 provided with a control valve 47 and leading to a nozzle box 48 provided with nozzles 49 adapted to discharge steam against the buckets 19 of the turbine wheel. As will be seen in Fig. 2, nozzle box 48 is arranged between two of the combustion chambers and covers a relatively small arc. For example, it may comprise only three or four nozzle partitions which define two or three nozzle passages. The nozzles 18 which direct combustion gases to the turbine wheel occupy all of the nozzle arc except that limited portion occupied by the steam nozzles 49. Connected with pipe line 46 is a branch pipe line 50 provided with a suitable control valve 51. Branch pipe line 50 may supply steam for any suitable purpose. For example, in the case of a locomotive engine, it may supply steam for car heating purposes.

Associated with the steam boiler is an auxiliary or starting combustion chamber 52 of suitable construction to which fuel may be supplied from a suitable source through a fuel nozzle 53. Mounted adjacent combustion chamber 52 is an air compressor 54 which may be driven by an electric motor 55, as shown in Fig. 3. The inlet of the compressor is indicated at 56 and its outlet is indicated at 57. It is shown as being a compressor of the centrifugal type. Its discharge end is connected with an air chamber 58 defined by suitable walls 59 and from which chamber air is supplied to the combustion chamber 52 as indicated by the arrows 60. The discharge end of combustion chamber 52 is indicated at 61. It supplies gases to the steam boiler for heating it, independently of the operation of the gas turbine.

The side portions 77 of walls 29 are suitably shaped to extend up on each side of the heat exchanger, the steam boiler, and the superheater so that in conjunction with end walls 62 and 63 they form a housing or enclosure for the tubes of the heat exchanger, the steam boiler and the superheater and serve to effect flow of the exhaust gases over them.

The steam boiler and combustion chamber 52 form a starting means for the gas turbine plant. When the plant is to be started, compressor 54 is operated by motor 55 to supply air to combustion chamber 52 and fuel is supplied to it from the fuel supply source. For example, a motor driven fuel pump may be utilized. Products of combustion from combustion chamber 52 are supplied to the boiler and serve to generate steam in the boiler. Steam from the boiler is then supplied through pipe line 46 and nozzles 49 to the turbine wheel thus operating the turbine which in turn drives compressor 6 to supply air to the combustion chambers 12. At the same time fuel is supplied to the combustion chambers. After ignition is started in the combustion chambers 12, the auxiliary combustion chamber 52 may be shut down. In this connection, it will be understood that the accessories of the gas turbine power plant, such as the fuel pump, for example (not shown), may be driven from shaft 2, usually through suitable gearing.

After the power plant is in operation, the exhaust gases from the turbine wheel serve to preheat the air supplied to the combustion chambers after which it may be utilized to generate steam in the boiler. Such steam may be used for heating purposes or for other desired purposes. Also, if desired, it may be supplied to the turbine wheel by nozzles 19 whereby the steam boiler is utilized to assist in driving the turbine wheel during normal operation.

By the invention, there is provided a compact gas turbine power plant well adapted for mounting on a locomotive in which heat contained in the gases exhausting from the gas turbine wheel are utilized to advantage in the heat exchanger and in the steam boiler which functions as a waste heat boiler, and in which the waste heat boiler, by means of the auxiliary combustion chamber, may function as a flash boiler to provide steam for starting the power plant. This latter is regarded as one important feature of the invention.

In accordance with the provisions of the patent statutes, we have described the principle of operation of our invention, together with the apparatus which we now consider to represent the best embodiment thereof, but we desire to have it understood that the apparatus shown is only illustrative and that the invention may be carried out by other means.

What we claim as new and desire to secure by Letters Patent of the United States, is:

1. In a compact portable turbine powerplant, the combination of an air compressor and a turbine with their rotors mounted on a common shaft, the inlet end of the compressor being adjacent the discharge side of the turbine and the compressor discharge scroll remote from the turbine, a nozzle diaphragm for the turbine including hot gas nozzles and a limited arc of steam nozzles, bearing means supporting the shaft including a bearing at either end of the shaft and an intermediate bearing between the compressor and turbine, an end wall spaced from the turbine end and arranged to support the turbine end bearing, an annular plenum chamber surrounding the turbine end bearing between the turbine and the end wall, a plurality of combustors radially spaced from and circumferentially spaced around the turbine end bearing and projecting through and supported by the end wall, each combustor including an outer substantially cylindrical casing and an inner liner spaced from the casing to form an annular air inlet passage therebetween, the inner liner having an end transition section communicating with the turbine nozzle diaphragm and the outer casing having an end portion terminating within the plenum chamber and cooperating with the liner transition section to form an annular opening arranged to admit air from the plenum chamber to the air inlet passage of the combustor, an air preheater arranged closely adjacent and immediately above the compressor and turbine, conduit means connecting the discharge scroll of the compressor with the preheater and the plenum chamber in series flow arrangement, and an annular turbine discharge casing surrounding the intermediate bearing and spaced therefrom to provide free access of ambient air to the compressor inlet, the side walls of the discharge casing extending upwardly and transitioning to the bottom of the preheater casing to form the hot gas inlet thereto, a steam waste heat boiler mounted above, supported directly on, and arranged to receive hot combustion gases discharged from the preheater, means for supplying steam from the boiler to the steam nozzles of the turbine, and auxiliary combustion means supported adjacent a side wall of the steam boiler and arranged to supply hot gases thereto independently of the operation of the turbine.

2. In a compact portable turbine powerplant, the combination of an air compressor and a turbine with their rotors mounted on a common shaft, the inlet end of the compressor being adjacent the discharge side of the turbine and the compressor discharge scroll remote from the turbine, a nozzle diaphragm for the turbine including hot gas nozzles and a limited arc of steam nozzles, bearing means supporting the shaft including a bearing at either end of the shaft and an intermediate bearing between the compressor and turbine, an end wall spaced from the turbine and arranged to support the turbine end bearing, an annular plenum chamber surrounding the turbine end bearing between the turbine and the end wall, a plurality of combustors radially spaced from and circumferentially spaced around the turbine end bearing and projecting through and supported by the end wall, each combustor including an outer substantially cylindrical casing and an inner liner spaced from the casing to form an annular air inlet passage therebetween, the inner liner having an end transition section communicating with hot gas nozzles of the turbine nozzle diaphragm and the outer casing having an end portion terminating within the plenum chamber and cooperating with the liner transition section to form an annular opening arranged to admit air from the plenum chamber to the air inlet passage of the combustor, an air preheater arranged closely adjacent and immediately above the compressor and turbine, conduit means connecting the discharge scroll of the compressor with the preheater and the plenum chamber in series flow arrangement, and an annular turbine discharge casing surrounding the intermediate bearing and spaced therefrom to provide free access of ambient air to the compressor inlet, the side walls of the discharge casing extending upwardly and transitioning to the bottom of the preheater casing to form the hot gas inlet thereto, a steam waste heat boiler mounted above, suported directly on, and arranged to receive hot combustion gases discharged from the preheater, and means for supplying steam from the boiler to the steam nozzles of the turbine.

3. In a compact portable turbine powerplant, the combination of an air compressor and a turbine with their rotors mounted on a common shaft, the inlet end of the compressor being adjacent the discharge side of the turbine and the compressor discharge scroll remote from the turbine, bearing means supporting the shaft including a bearing at either end of the shaft and an intermediate bearing between the compressor and turbine, an end wall spaced from the turbine and arranged to support the turbine end bearing, an annular plenum chamber surrounding the turbine end bearing between the turbine and the end wall, a plurality of combustors radially spaced from and circumferentially spaced around the turbine end bearing and projecting through and supported by the end wall, each combustor including an outer substantially cylindrical casing and an inner liner spaced from the casing to form an annular air inlet passage therebetween, the inner liner having an end transition section communicating with the turbine nozzle diaphragm and the outer casing having an end portion terminating within the plenum chamber and cooperating with the liner transition section to form an annular opening arranged to admit air from the plenum chamber to the air inlet passage of the combustors, an air preheater arranged closely adjacent and immediately above the compressor and turbine, conduit means connecting the discharge scroll of the compressor with the preheater and the plenum chamber in series flow arrangement, and an annular turbine discharge casing surrounding the intermediate bearing and spaced therefrom to provide free access of ambient air to the compressor inlet, the side walls of the discharge casing extending upwardly and transitioning to the bottom of the preheater casing to form the hot gas inlet thereto.

ARTHUR H. MOREY.
ALAN HOWARD.